Patented Dec. 16, 1930

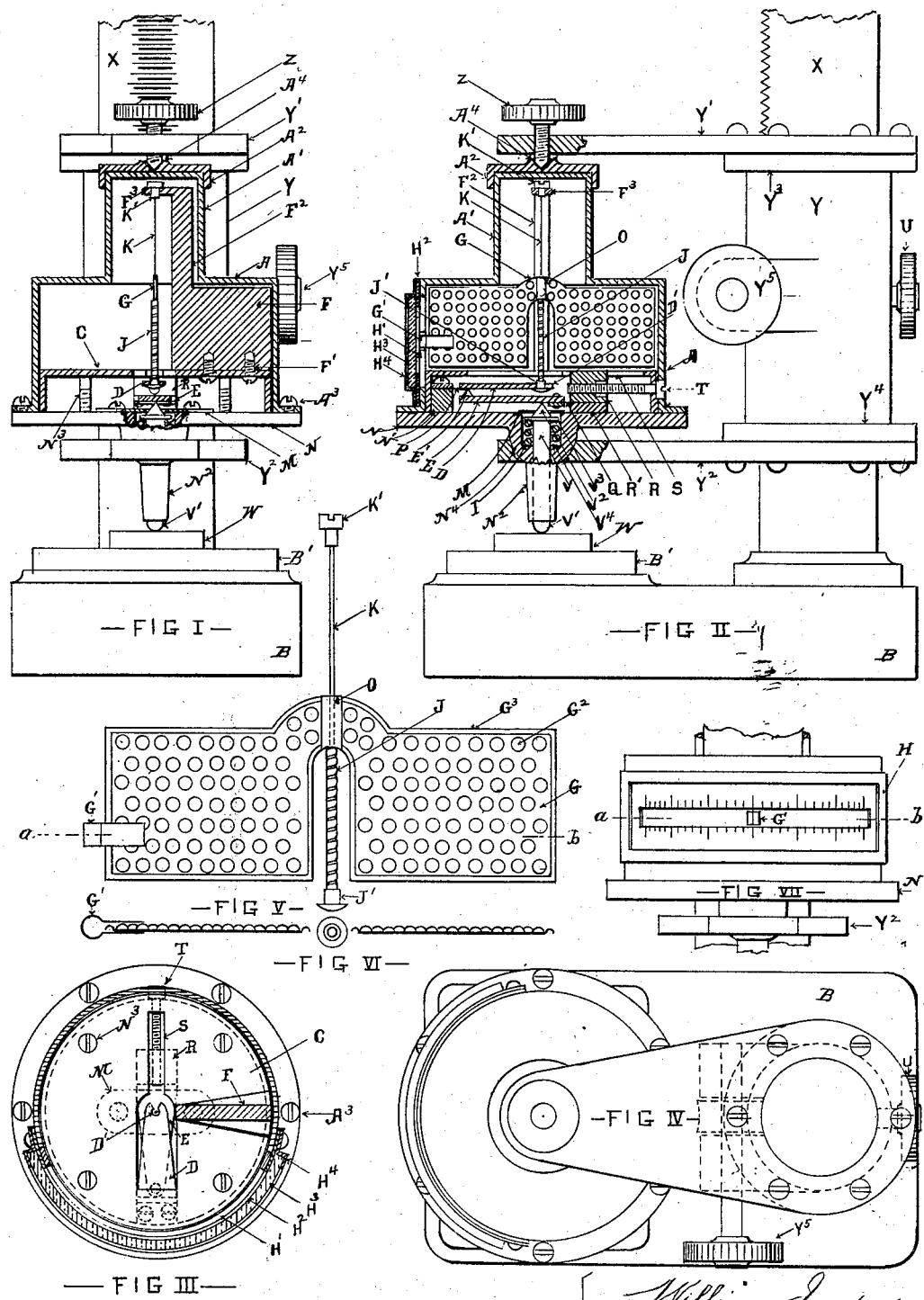

1,785,383

UNITED STATES PATENT OFFICE

WILLIAM JANDUS AND HERBERT S. JANDUS, OF EAST CLEVELAND, OHIO

PRECISION GAUGE

Application filed June 5, 1922. Serial No. 566,119.

Our invention is a departure from present methods of determining fine differences in measurements by introducing as a mechanical component a thin ribboned helicoid spring such as described in the application of William Jandus of Oct. 7th, 1921, Serial No. 506,221 and now pending, by which rectilinear motion may be translated into rotary movement and be registered as an angular deflection of a pointer on a scale reading. This angular deflection is then magnified to any degree by placing one or more spring-hinged levers in the path of the rectilinear movements.

The results mentioned above may be achieved by mechanical means such as are shown in the accompanying drawings.

Fig. I is a front elevational, partly sectional view of the gauge structure and base.

Fig. II is a side elevational, partly sectional view showing the manner of mounting the gauge structure on the base.

Fig. III is a cross sectional view of the shell or housing A on the line $a$—$b$ (see Fig. VII) to show a plan view of the inverted cup C, the position of levers D and E and the septum F in relation thereto, as also the structure of the removable scale H.

Fig. IV shows a detail.

Figs. V and VI are enlarged elevational and sectional views respectively of the air-cushioning vane.

Fig. VII is a fragmentary view in front elevation showing the scale and pointer associated therewith.

Referring now to Figs. I and II, A designates a flanged shell having an elongated neck A'. Within the shell is secured an inverted cup C which is secured to the floor casting N by means of countersunk screws $N^3$. The shell A is secured to the casting N by means of screws $A^3$. A septum or partition F is secured to the bottom of the cup by means of screws F' and has an elongation $F^2$ provided with an arm $F^3$ from which the ribbon K of the helicoid spring is suspended by means of a mounting K'. The septum F serves as a means for air cushioning the vane G' and for rendering it dead beat. The top surface of the inverted cup C is thus free from obstruction and the vane G may oscillate therein within the full scope of its movement.

Anchored to the floor casting N by means of the block N' is a lever D pivotally secured by means of a spring hinge P. This hinge is made to deflect the lever D downwardly. The helicoid spring J is attached to the lever at one end by means of a terminal mounting J' fitting into a cleft D'. Mounted on a flexible metal ribbon K which is a continuation of the helicoid spring is a vane G, which is fixedly secured to the ribbon K so as to turn therewith. The end of the spring J and the tension of the spring hinge P are so adjusted that when opposed to each other both are normally stretched within the safe limits of their elasticity and in which position they are balanced. In a right handed spring of the ribbon type the vane G will tend to rotate counter clockwise when the spring is stretched, the scope of such rotation being limited by the septum or partition F and the ribbon coil remains under a torsional strain. By rotating the mounting K' clockwise the torsional strain is relieved to the extent that the unflexed ribbon K is twisted in a direction opposite to the winding of the coil. When both torsional stresses are equalized the vane G assumes a highly sensitive neutral position, the slightest release in the rectilinear stress of the spring J sending the vane clockwise while a slight increase in the rectilinear stress will send the vane counter clockwise.

In order to multiply the leverage effect and to magnify the deflection of the angular de-deflection of the vane G to a predetermined scale of micro-measurements there is provided a leverage system comprising a spring fulcrumed lever D which is secured at one end to the mounting J' and at its opposite end to the spring hinge P. Slidably and adjustably secured within the cup C is a sliding block R which is movable in a groove S and in frictional contact with the floor casting N. An adjusting screw T moves the block R along the grooved path S. $N^2$ is a nipple in the casting N bored to snugly accommodate a sliding pin V one end of which V' is the measuring end which is adapted to contact with the object to be measured while the other end V² bears against a lever E which is pivotally secured to the block R by means of a spring hinge Q. The pin V is held within its bearing by plate M which is secured to the floor end by suitable screws. Arranged within the counterbore V⁴ is a coiled spring I which bears against the collar V³ on the pin. The plate M has a centrally disposed opening through which the pointed upper end of the pin projects, as shown most clearly in Figs. 1 and 2. The movement of the pin upwardly is limited by the plate M and its movement downwardly is limited by the spring I which rests loosely in the counterbore. The movement of the pin upwardly is limited by the plate M and its movement downwardly is limited by the spring I. The upper end of the pin V is the locus at which force is applied to the lever E. The lever E is provided with a somewhat triangular projection E' which bears against the lever E, the purpose of which will hereinafter appear.

It will now be clear that when the pin V is moved upwardly that its motion will be transmitted first to the lever E and then to the lever D to effect a tensioning of the spring J. By moving the slidable block R, the point of engagement of the pin V with the lever E will be changed and the distance between this point and the fulcrum of the lever E will also be changed. In this way, the longitudinal movement of the lever D may be varied, or in other words, by shortening the distance between the point where force is applied and the fulcrum of the lever E the angular movement of the spring J will be magnified and the rectilinear motion of the pin V will be translated into a rotary movement of the vane G and effect an angular deflection of the pointer on the scale. This angular deflection can be magnified to any degree by placing one or more spring hinged levers in the path of the rectilinear movement of the pin V.

The vane G is preferably made of aluminum foil stiffened by pebbled corrugations G² as shown most clearly in Fig. V. This stiffening may be reinforced by grooved corrugations along the edges of the vane as shown at G³. The torsional element is secured to the vane G preferably by means of cement and a strip of foil as shown at O. A marker or pointer G' shown in Fig. V is attached to the vane in a similar manner. The pointer G' is adapted to move in the plane of the scale in order to avoid the effect of paralax.

Figs. II, III, IV and VII show the construction of the removable scale H. H' is a segment of the shell A upon which the scale is marked off. This segment is secured to a spacer H² interposed between the glass H³ and the scale H to provide clearance for the pointer G'. H⁴ is a metal casing surrounding the glass H³. The parts H', H², H³ and H⁴ are designed to fit together as a single assembled unit.

The precision gauge, the structural parts of which have been described, is mounted upon a rack and pinion mechanism as shown in Figs. I, II and IV. X and Y are rack and pinion devices for raising and lowering the gauge and for rough adjustments to the work to be measured. The rack X is rigidly secured to the base plate B. B' is an anvil and W is the work to be measured. The pinion casting Y is provided with flanges Y³ and Y⁴ to which are secured comparatively stiff springs Y' and Y². At the end of the spring Y' and screw threaded into it is a knurled screw Z for making fine adjustments with the work W. The screw Z enters a conical depression A⁴ in the metal cap A² which fits snugly over the neck A' of the gauge. In the lower end of the spring Y and in vertical alignment with the adjusting screw Z is a socket N⁴ into which the ball end of the nipple N² fits adjustably. By tightening the adjustment screws the measuring point of the pin B approaches the work W in direct ratio to the pitch of the thread of the screw minus the effective yield of the spring Y' upwardly in its relation to the yield of the spring Y² downwardly. Where both springs are equally strong the yield upward will equal the yield downward and the effective travel of the point V' for a turn of the screw will be one half of the screw pitch. The heavier the lower spring Y² the finer the micrometric adjustment per turn of the adjusting screw.

It will now be clear that we have provided a precision gauge which will accomplish the objects of the invention as hereinbefore stated.

Having described our invention, what we claim is:

1. A gauge of the character set forth comprising a base, a measuring element disposed in operative relation to said base and adapted to move relative thereto, a lever system connected to said element, torsional spring means connected to said lever system, an indicating needle carried by said torsional spring means, and means for varying said lever system to vary the ratio of movement between said element and needle.

2. A gauge of the character set forth comprising a measuring element adapted for rectilinear movement, an indicating needle adapted for rotary movement, torsional means supporting said indicating needle, a leverage system disposed in operative relation to said measuring element and interconnecting said measuring element and torsional means whereby the movement of said measuring element will cause an angular deflection of said indicating needle.

3. A precision gauge as set forth in claim 2 having means for varying the position of a part of said leverage system with respect to said measuring element whereby to vary the ratio of movement between said measuring element and indicating means.

4. A gauge of the character set forth comprising a base, a measuring element disposed in operative relation to said base and adapted to move relative thereto, a leverage system disposed in operative relation to said measuring element, torsional means connected with said leverage system and having an indicating needle carried thereby and means for varying the ratio of movement between said measuring element and indicating needle.

5. A gauge of the character set forth comprising a casing, a torsional means supported within said casing, an indicating needle suspended on said torsional means and movable therewith, a measuring element disposed in operative relation to said torsional means and adapted for rectilinear movement, means for transmitting the rectilinear movement of said measuring element to said torsional means whereby to cause an angular deflection of said needle.

6. A precision gauge as set forth in claim 5 having means for varying the ratio of movement between said measuring element and indicating needle.

7. A precision gauge of the character set forth comprising a casing, an indicating device torsionally suspended for angular deflection, a measuring element disposed in operative relation to said indicating device, means interconnecting said measuring element and indicating device for transmitting the movement of said measuring element to said indicating device, and means for adjusting the ratio of angular deflection of said needle with respect to the movement of said measuring element.

8. A precision gauge of the character set forth comprising a shell, a member arranged within said shell, a helicoid spring suspended from said member, an indicating needle carried by said helicoid spring and adapted for rotary movement, a measuring element adapted for rectilinear movement and a leverage system interconnecting said measuring element and helicoid spring whereby a rectilinear movement of said measuring element will cause an angular deflection of said indicating needle.

9. A precision gauge as set forth in claim 8 in which said helicoid spring is provided with a vane for rendering the same dead beat.

10. A precision gauge as set forth in claim 8 having means for varying the position of a part of said leverage system with respect to said measuring element whereby to vary the ratio of movement between said measuring element and indicating needle.

WILLIAM JANDUS.
HERBERT S. JANDUS.